United States Patent [19]

Pham Van Cang

[11] 4,408,337
[45] Oct. 4, 1983

[54] TELEVISION BASE SIGNAL AND TEST SIGNAL GENERATOR

[75] Inventor: Luc Pham Van Cang, Paris, France

[73] Assignee: Thomson-CSF, Paris, France

[21] Appl. No.: 236,631

[22] Filed: Feb. 20, 1981

[30] Foreign Application Priority Data

Feb. 26, 1980 [FR] France .................................. 80 04207

[51] Int. Cl.³ ............................................. H04N 7/02
[52] U.S. Cl. ..................................... 377/44; 358/139
[58] Field of Search .................. 358/139; 235/92 CC; 377/44

[56] References Cited

U.S. PATENT DOCUMENTS

| | | | |
|---|---|---|---|
| 4,115,810 | 9/1978 | Mikado | 358/139 |
| 4,172,263 | 10/1979 | Tenten | 358/139 |
| 4,268,851 | 5/1981 | Heller | 358/139 |
| 4,322,749 | 3/1982 | Weston | 358/139 |
| 4,326,219 | 4/1982 | Griesshaber | 358/139 |

Primary Examiner—Howard Britton
Attorney, Agent, or Firm—Cushman, Darby & Cushman

[57] ABSTRACT

A television base signal and test signal generator comprises a first memory for storing n eight-bit words (n being a positive whole number) located by a pair of indices (i, j) and a second memory for storing t four-bit words (t being a positive whole number) located by an index k. A first counter and a second counter supply respectively the index i associated with the word to be read in the first memory and the index k associated with the word to be read in the second memory. The index j associated with the word to be read in the first memory corresponds to the value of the four-bit word supplied by the second memory. The two memories are programmed so that at all times the eight bits of the word read in the first memory define entirely the desired base signals and test signals.

3 Claims, 1 Drawing Figure

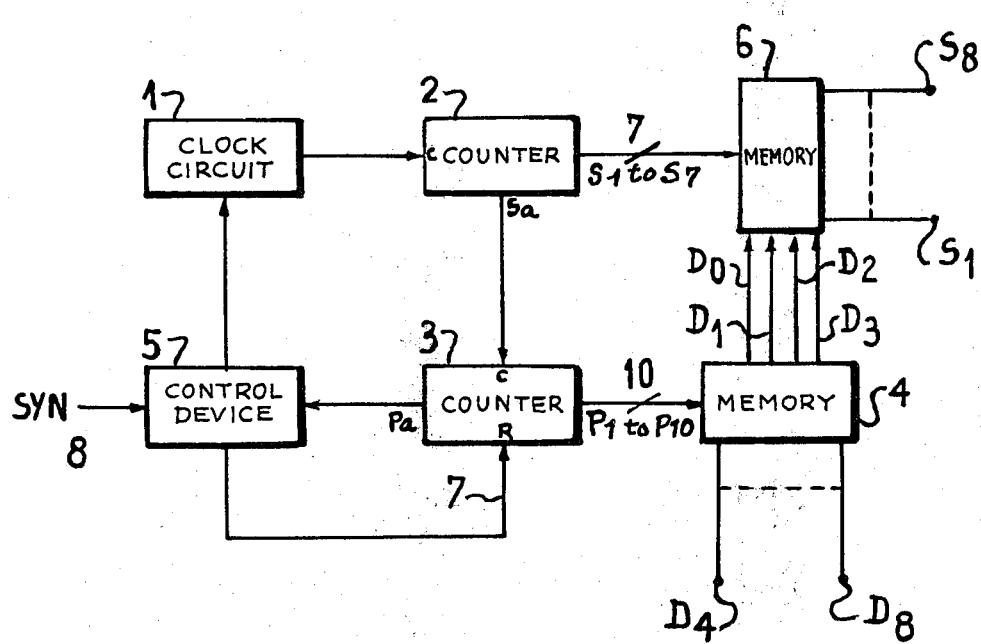

TELEVISION BASE SIGNAL AND TEST SIGNAL GENERATOR

BACKGROUND OF THE INVENTION

The present invention relates to television test signal and base signal generators and television systems comprising such generators.

In present television equipment, it is useful to create, on the one hand, signals serving for generating a television signal, called television base signals and, on the other hand, signals for controlling the quality of the television signal, called television test signals.

For that, it is known to centralize a generator of such signals and to effect distribution by means of cable to all the equipment whose operation requires use of these signals.

But the cost of cabling the equipment to the centralized generator is generally very expensive. Furthermore, it is not convenient to use cables.

Another method, generally less expensive, consists in generating these signals in each of the pieces of television equipment.

However, this method, which is often preferred to distribution by multiple cables, lacks flexibility. In fact, it requires as many generating circuits as there are types of signals to be generated. In the case where the equipment is subject to a special specification involving the use of signals other than those provided for, problems may exist for incorporating new circuits in the conventional equipment.

The television test and base signal generator of the present invention allows a large number of different signals to be created able to correspond to different cases of use from a single basic circuit. This generator is distinguished by its flexibility of use.

SUMMARY OF THE INVENTION

According to the invention, there is provided a television test signal and base signal generator comprising a first memory with p memory zones each having q memory cells (p and q being positive whole numbers), each cell storing an assembly of bits defining entirely, for a quantum of time $T_o$, the amplitude of base signals and test signals able to be generated; a second memory with t memory cells (t being a positive whole number), each cell memorizing a binary number associated with a memory zone of the first memory; a first counter for reading successively the t memory cells of the second memory; a second counter for reading, at a frequency $1/T_o$, the memory cells of the memory zone associated with the binary number delivered by the second memory.

DESCRIPTION OF THE DRAWING

The invention will be better understood and other characteristics will appear from the description and single accompanying FIGURE in which there is shown one embodiment of the generator of the invention.

DESCRIPTION OF THE PREFERRED EMBODIMENT

In this FIGURE, a single connection is shown by a fine line and a multiple connection by a fine line intersecting a small straight-line segment beside which a number indicates the number of single connections forming this multiple connection.

Furthermore, in this FIGURE there is shown a clock circuit 1 connected to the input of a counter 2. This counter 2 comprises seven outputs (called outputs $s_1$ to $s_7$ in the rest of the text) respectively connected to seven address inputs of a first read-only memory (ROM) 6 and an auxiliary output (called $s_a$ in the rest of the text) connected to the input of a counter 3. This counter 3 comprises ten outputs (called outputs $P_1$ to $P_{10}$ in the rest of the text) respectively connected to ten address inputs of a second read-only memory (ROM) 4 and an auxiliary output (called $P_a$ in the rest of the text) connected to a first input of a control device 5 of which a first output is connected to a control input of clock circuit 1. The second memory 4 comprises four outputs $D_0$ to $D_3$ respectively connected to four auxiliary address inputs of the ROM 6 and four auxiliary outputs connected respectively to four output terminals $D_4$ to $D_8$. Memory 6 has furthermore eight outputs connected respectively to eight output terminals $S_1$ to $S_8$. A reset input 7 of counter 3 is connected to a second output of control device 5 of which a second input 8 is intended to receive an external synchronization signal SYN.

The generator which has just been described comprises an assembly of elements (1, 2, 3, 4 and 6) for generating the desired base signals and test signals at output terminals $S_1$ to $S_8$, and a control device 5 indispensable for synchronizing a group of several generators of this type.

The signals delivered by the generator described apply to a conventional 625-line television system.

It should be noted that the base signals and test signals of a television system are standardized signals, strictly characterized in amplitude and duration. This standardization requires that these signals be defined by amplitude and time quanta in a limited number. In fact, ten amplitude levels and a quantum of time $T_o$ equal to 0.8 $\mu$s is sufficient to characterize a complete system of television base signals and test signals.

The operation of the generator shown in the FIGURE is the following.

The clock circuit 1 is a quartz pilot of VCXO type whose frequency of use is greater than $1/T_o$.

The control device 5 provides control of the clock circuit 1 and of counter 3 so as to ensure synchronism between the clock signal supplied by clock circuit 1, the resetting times of counter 3 and the external synchronization signal SYN.

The ROM 4 and 6 are memories of type 2716, formed from 2048 memory cells each able to store eight bits. These memories comprise, apart from the functional connections (not shown) which are proper to them, eight outputs and eleven address inputs, and are characterized by the fact that they generate output signals which are a function of the signals present at their address inputs.

Among the 2048 memory cells of memory 6, 1280 cells are used for storing 1280 words of eight bits. These 1280 cells are grouped in sixteen distinct memory zones shown by an index j (j varying from 0 to 15). Each memory zone comprises 80 memory cells shown by an index i (i varying from 0 to 79). Thus the 1280 effective cells are shown by the values of the index pair (i, j).

Each eight-bit word stored defines entirely, for a quantum of time $T_o$, the amplitude of the base signals and test signals able to be generated. For example, to define: four signals $X_1$ to $X_4$ whose amplitude may assume two values, and a signal $X_5$ whose amplitude may assume sixteen values, it is sufficient to associate a first bit with the value of the amplitude of signal $X_1$, a second bit with that of signal $X_2$, a third bit with that of signal $X_3$, a fourth bit with that of signal $X_4$, and to associate the four remaining bits with the amplitude value of the signal $X_5$.

When the 80 memory cells of the same memory zone are read successively at frequency $1/T_o$, the eight outputs of memory 6 deliver eight binary signals of a total duration equal to 80 $T_o$. These eight binary signals define entirely, for a duration of 80 $T_o$, the amplitude of the desired base signals and test signals. The sixteen memory zones allow sixteen different configurations of binary signals of a duration of 80 $T_o$ to be stored, which corresponds to defining sixteen base signal and test signal configurations. Memory 6 is then programmed so that the sixteen configurations stored correspond to those desired, for example:

Configuration corresponding to the television image part (active frame).
Configuration corresponding to the vertical suppression.
Configuration corresponding to the vertical synchronization.
Configuration corresponding to the equalization (pre-equalization and post-equalization).
Configuration corresponding to the test signal insertion, etc.

Among the 2018 memory cells of memory 4, 625 cells are used for storing 625 eight-bit words. These cells are shown by the index t (t varying from 0 to 624).

Counter 2 is formed by a chain of seven binary dividers (not shown). The frequency of the signal from the last divider of the chain is equal to the television line frequency $F_L$. The seven outputs of the seven dividers form the seven outputs $s_1$ to $s_7$ of counter 2. This counter 2 counts from 0 to 79 then is reset. The duration of counting is that of a television line, this duration is formed from 80 quanta of time $T_o$.

The signals present at the outputs $s_1$ to $s_7$ of counter 2 permit the successive reading out, from memory 6, of the eight-bit words contained in the cells shown by the pairs (0, j) to (79, j). The reading frequency is $1/T_o$.

Counter 3 is coupled to counter 2 to receive a clock signal at frequency $2F_L$. This counter 3 is formed by a chain of 10 binary dividers (not shown). The frequency of the signal from the last divider is equal to the television frame frequency $F_V$ ($F_V=2F_L/625$). The ten outputs of the ten dividers form the ten outputs $P_1$ to $P_{10}$ of counter 3. This counter 3 counts from 0 to 624 then is reset. The duration of the counting is that of a television frame, this duration is formed from 625 quanta of time $40T_o$ ($40T_o$ corresponding to the duration of half a television line).

The signals present at the outputs $P_1$ to $P_{10}$ of counter 3 permit the successive reading out, from memory 4, of the eight-bit words contained in the cells numbered from 0 to 624. The reading frequency is $1/40T_o$.

The state of the four bits delivered at the outputs $D_0$ to $D_3$ of memory 4 indicate the value of index j of the cell to be read in memory 6. The remaining outputs $D_4$ to $D_8$ of memory 4 supply additional frame information. Thus, memory 6 delivers, for each quantum of time $T_o$, the eight bits stored in the memory cell whose location index pair is given by the signals present at the outputs $s_1$ to $s_7$ of counter 2 (for index i) and by the signals present at the outputs $D_0$ to $D_3$ of memory 4 (for index j).

To obtain, at the eight output terminals $S_1$ to $S_8$ of memory 6, the desired base signal and test signal configuration, it is sufficient to program memory 4 so that it delivers the value of index j associated with the desired configuration.

The role of memory 4 is that of an address memory.

In fact, on the one hand the ten signals present at the outputs $P_1$ to $P_{10}$ of counter 3 cannot address directly memory 6 (that would require too high a memory capacity), and on the other hand 16 configurations of an assembly of eight binary signals are sufficient, in our example, for defining the amplitude of the desired base signals and test signals.

The user of the generator programs memory 4 so as to obtain, during the duration of a frame, the configurations that he desires.

It should be noted that for generating a signal at N (N being a positive whole number) amplitude levels, it is sufficient to program memory 6 so that M (M being between 1 and 8) of the eight output signals of this memory 6 characterize this signal.

For example, the amplitude of a signal at sixteen amplitude levels will be entirely defined by four binary signals.

The outputs $D_4$ to $D_8$ of memory 4, not used for locating the cells of memory 6, serve to supply directly frame recurrence signals.

This description of operation shows that the device may be adapted to very different special requirements without modification of its structure. In fact, the user programs (or reprograms) memories 4 and 6 according to his needs.

The invention is not limited to the embodiment described and shown.

In particular, the generator is not limited to eight output signals. By using two 2716 memories, sixteen output levels are simultaneously available, which allows a finer acquisition of the desired base signals and test signals. Similarly, it is also possible to use a finer quantification of the time than that considered.

It is within the scope of a man skilled in the art to use, for memories 4 and 6, either random access memories (RAM), or random access memories (ROM) or programmable read-only memories (PROM) or a field-programmable logic array (FPLA) or any other similar device. It should be noted that the number of signals generated and the complexity of these signals depend on the memory capacity used.

What is claimed is:

1. A generator of television base signals and test signals comprising:
    a first memory with p memory zones each having q memory cells (p and q being positive whole numbers), each cell storing an assembly of bits defining entirely, for a quantum of time $T_0$, the amplitude of base signals and test signals able to be generated, said first memory having a first and a second address input and an output;
    a second memory with t memory cells (t being a positive whole number), each cell storing a binary number which is the address of a memory zone of the first memory, this second memory having an address input and having an output coupled to the first address input of the first memory;
    a first counter having an output coupled to the address input of the second memory for reading successively its t memory cells;

a second counter having an output coupled to the second address input of the first memory for reading, at a frequency $1/T_0$, the memoory cells of the memory zone associated with the binary number delivered by the second memory.

2. The television base signal and test signal generator as claimed in claim 1 wherein the first counter is a counter from 0 to $t-1$ at a frequency $1/nT_0$ (n being a positive whole number), and wherein the second counter is a counter from 0 to $q-1$ at a frequency $1/T_o$, the counting duration from 0 to $q-1$ of the second counter and the counting duration from 0 to $t-1$ of the first counter being respectively equal to the duration of a television line and to the duration of a television frame.

3. The television base signal and test signal as claimed in claim 1, wherein the first and second counter have respectively a clock input, wherein the second counter has an auxiliary output coupled to the clock input of the first counter, and furthermore comprising a clock circuit coupled to the clock input of the second counter and a control device coupled to the clock circuit to synchronize this latter on an external signal.

* * * * *